(12) United States Patent
Uusitalo et al.

(10) Patent No.: US 9,832,814 B2
(45) Date of Patent: Nov. 28, 2017

(54) METHOD AND APPARATUS FOR MULTIMODE COMMUNICATION

(75) Inventors: Mikko Uusitalo, Helsinki (FI); Antti Sorri, Helsinki (FI); Enrico-Henrik Rantala, Iittala (FI); Esa Malkamäki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/362,138

(22) PCT Filed: Dec. 2, 2011

(86) PCT No.: PCT/FI2011/051074
§ 371 (c)(1),
(2), (4) Date: Jun. 2, 2014

(87) PCT Pub. No.: WO2013/079765
PCT Pub. Date: Jun. 6, 2013

(65) Prior Publication Data
US 2014/0323180 A1    Oct. 30, 2014

(51) Int. Cl.
*H04W 88/06* (2009.01)
*H04W 68/12* (2009.01)
*H04W 52/02* (2009.01)

(52) U.S. Cl.
CPC ........... *H04W 88/06* (2013.01); *H04W 68/12* (2013.01); *H04W 52/0229* (2013.01); *Y02B 60/50* (2013.01)

(58) Field of Classification Search
CPC ................................................ H04W 72/1215
See application file for complete search history.

(56) References Cited

U.S. PATENT DOCUMENTS

| | | | | |
|---|---|---|---|---|
| 8,175,584 B2* | 5/2012 | Estevez | ................. | H04W 48/18 370/255 |
| 8,249,031 B1* | 8/2012 | Hirsch | .............. | H04W 72/1215 370/336 |
| 8,391,918 B2* | 3/2013 | Ekici | ..................... | H04W 48/18 455/428 |
| 8,407,299 B2* | 3/2013 | Bakker | ............... | H04L 65/1016 709/206 |
| 8,463,913 B2* | 6/2013 | Bakker | ............... | H04W 76/007 709/203 |
| 8,539,104 B2* | 9/2013 | Shenfield | ................ | H04L 67/06 709/203 |

(Continued)

FOREIGN PATENT DOCUMENTS

| | | |
|---|---|---|
| EP | 1578095 A1 | 9/2005 |
| EP | 1962532 A1 | 8/2008 |
| WO | WO 2006061692 A2 | 6/2006 |

*Primary Examiner* — Bobbak Safaipour
(74) *Attorney, Agent, or Firm* — Seppo Laine Oy

(57) ABSTRACT

In accordance with an example embodiment of the present invention, there is provided an apparatus comprising a transceiver configured to support operation of the apparatus in accordance with a first radio access technology, RAT, and a second radio access technology, RAT, the transceiver being configured to receive an indication conveyed over the second radio access technology, the indication indicating that data is incoming to the apparatus and that the data is to be conveyed over the first radio access technology, and at least one processing core configured to, responsive to the indication, cause the apparatus to receive the data by operating in accordance with the first radio access technology.

19 Claims, 3 Drawing Sheets

(56) References Cited

U.S. PATENT DOCUMENTS

| | | | |
|---|---|---|---|
| 8,634,435 B2* | 1/2014 | Kadous | H04W 72/1215 370/462 |
| 9,301,240 B1* | 3/2016 | Chindapol | H04W 48/16 |
| 9,516,585 B1* | 12/2016 | Chindapol | H04W 48/16 |
| 2010/0293253 A1 | 11/2010 | Kaida | |
| 2011/0242969 A1 | 10/2011 | Dayal et al. | |
| 2012/0140743 A1* | 6/2012 | Pelletier | H04W 72/0453 370/335 |
| 2014/0099950 A1* | 4/2014 | Mildh | H04W 56/001 455/434 |

* cited by examiner

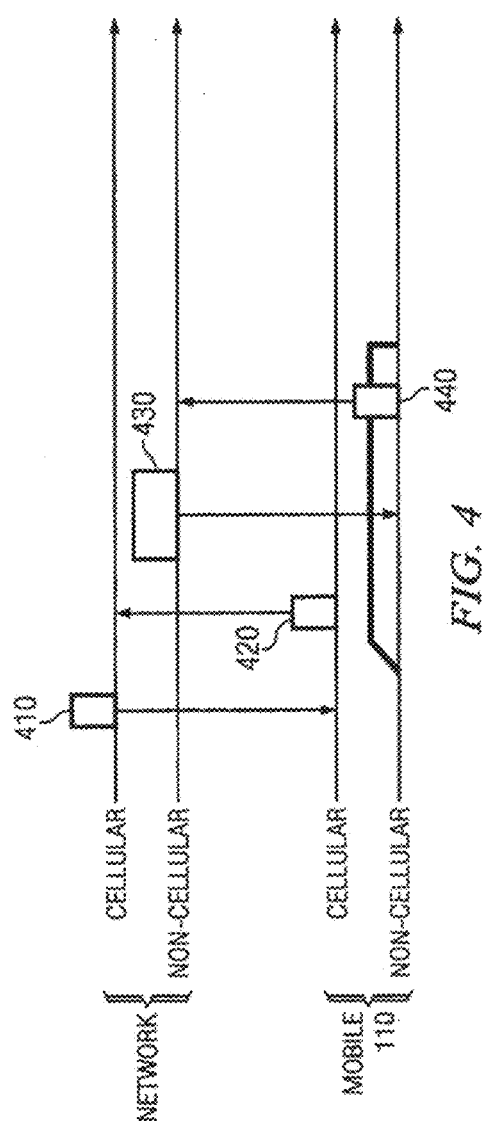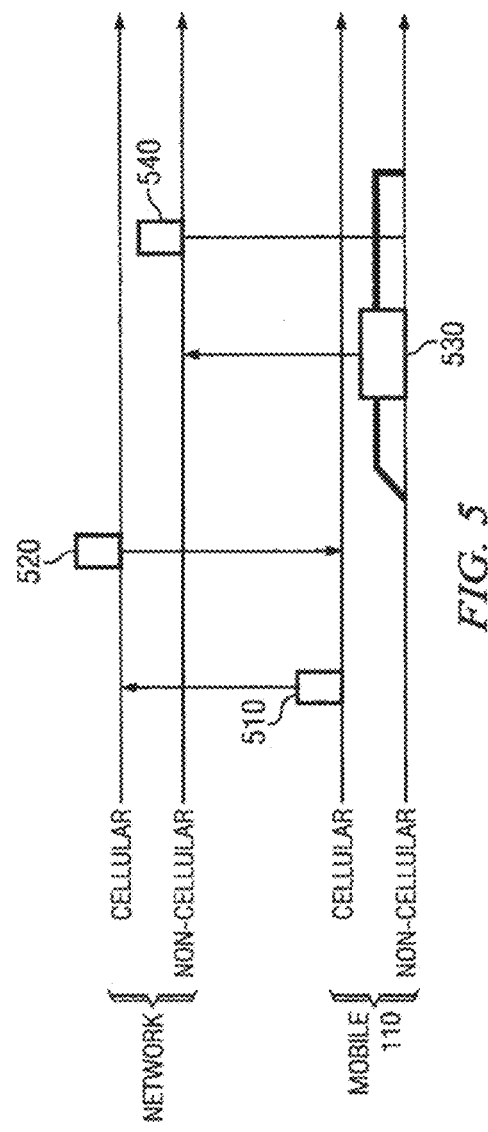

METHOD AND APPARATUS FOR MULTIMODE COMMUNICATION

TECHNICAL FIELD

The present application relates generally to wireless communication using more than one radio access technology.

BACKGROUND

Wireless communication between electronic devices requires that devices participating in the communication, for example a base station and a mobile station, are configured to conform to an agreed framework for communication. The agreed framework comprises procedures that are used to effect the communication in the framework context, wherein the context may comprise for example air interface resources, or radio resources, such as frequency bands. Such frameworks may be known as radio access technologies, or RATs. A RAT may be defined in industry standards that device manufacturers can refer to when designing products such that they are capable of communicating according to the RAT.

When standards are used correctly, interoperability between devices from a plurality of suppliers may be achieved. For example, a cellular telephone produced by a first manufacturer may be capable of communicating with a cellular telephone produced by a second manufacturer, using a base station produced by a third manufacturer and a core network produced by a fourth manufacturer.

Radio access technologies may be designed for specific use cases in mind. For example, cellular telephony RATs may be optimized for ease of roaming, wide-area coverage and battery power efficiency. On the other hand, other RATs such as those designed for wireless hotspots for stationary users may be optimized to produce high peak datarates in the network to mobile direction.

Some wireless communication devices, such as for example cellular telephones or tablet computers, are furnished with a capability to communicate wirelessly using more than one RAT. Such devices may offer benefits of more than one RAT, but may also suffer drawbacks of more than one RAT as well. For example, keeping several RATs active may involve supplying power to a transceiver or transceivers comprising several radios. Each RAT may also be associated with a certain base processor load needed to maintain the RAT in an active state. Interworking more than one RAT in a portable device may also give rise to problems when radio transmissions of a first RAT interfere with radio reception of a second RAT, for example.

Methods to improve interoperation between RATs may include, for example, selecting non-overlapping frequency ranges for the respective RATs to avoid interference. Alternatively or in addition communications pertaining to each RAT may be sequenced so that only one RAT is active at any given time. For example, a communication device may partition time into consecutive non-overlapping timeslots and assign the timeslots to different RATs the communication device is configured to communicate in accordance with.

SUMMARY

Various aspects of examples of the invention are set out in the claims.

According to a first aspect of the present invention, there is provided an apparatus, comprising a transceiver configured to support operation of the apparatus in accordance with a first radio access technology and a second radio access technology, the transceiver being configured to receive an indication conveyed over the second radio access technology, the indication indicating that data is incoming to the apparatus and that the data is to be conveyed over the first radio access technology, and at least one processing core configured to, responsive to the indication, cause the apparatus to receive the data by operating in accordance with the first radio access technology.

According to a second aspect of the present invention, there is provided a method, comprising supporting operation of an apparatus in accordance with a first radio access technology and a second radio access technology, receiving an indication conveyed over the second radio access technology, the indication indicating that first data is incoming to the apparatus and that the first data is to be conveyed over the first radio access technology, and responsive to the indication, causing the apparatus to receive the first data by operating in accordance with the first radio access technology.

According to a third aspect of the present invention, there is provided an apparatus, comprising means for supporting operation of the apparatus in accordance with a first radio access technology and a second radio access technology, means for receiving an indication conveyed over the second radio access technology, the indication indicating that data is incoming to the apparatus and that the data is to be conveyed over the first radio access technology, and means for causing the apparatus, responsive to the indication, to receive the data by operating in accordance with the first radio access technology.

According to further aspects of the present invention, there are provided computer programs and computer program products encoded with computer programs configured to cause methods according to embodiments of the present invention to be performed, when run.

BRIEF DESCRIPTION OF THE DRAWINGS

For a more complete understanding of example embodiments of the present invention, reference is now made to the following descriptions taken in connection with the accompanying drawings in which:

FIG. 4 is a signaling diagram showing operations for a method according to an embodiment of the invention; and FIG. 5 is a signaling diagram showing operations for a method according to an embodiment of the invention.

DETAILED DESCRIPTION OF THE DRAWINGS

An example embodiment of the present invention and its potential advantages are understood by referring to FIGS. 1 through 5 of the drawings.

Figure 1:
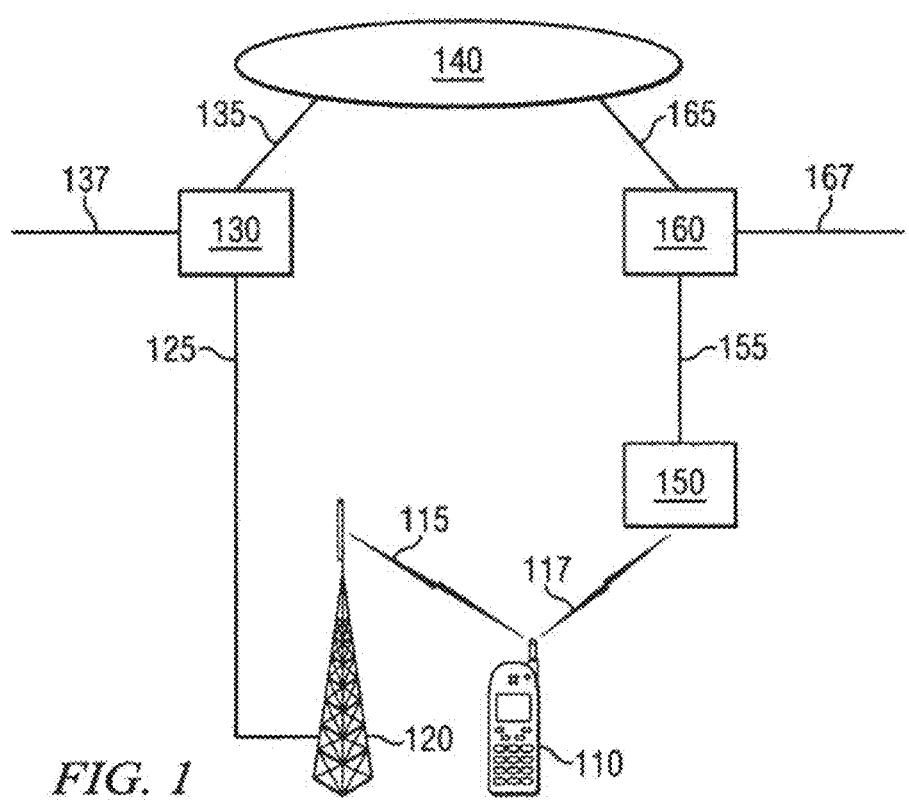
FIG. 1 illustrates an example system where at least some embodiments of the present invention may be employed.

FIG. 1 illustrates an example system where at least some embodiments of the present invention may be employed. Mobile apparatus 110, or mobile 110, for example a mobile phone, personal digital assistant, PDA, cellular phone, palmtop computer, laptop computer, tablet computer or other mobile communications-capable device, is connected to base station 120 by means of wireless link 115. Wireless link 115 may comprise an uplink capable of conveying information from mobile 110 to base station 120 and a downlink capable of conveying information from base station 120 to mobile 110. Wireless link 115 may be in conformance with a cellular radio-access technology such as, for example, wideband code division multiple access, WCDMA, global system for mobile communications, GSM or long term evolution, LTE. Mobile 110 may be powered by a battery comprised in mobile 110. Device 110 is herein referred to as a mobile, but it is to be understood that the scope of the description encompasses also embodiments where the device is immobile.

Base station 120 may be capable of communicating in accordance with at least one, and in some embodiments more than one, cellular technology such as, for example, those mentioned above. Base station 120 may be powered from a stable power source and may be furnished with a backup battery. Base station 120 may be connected to a core network node 130 by means of connection 125. Connection 125 may be a wire-line connection or, for example, a directional microwave link. Core network node 130 may act as a gateway toward further nodes and may be configured to perform functions relating to controlling a cellular communications network. Examples of such functions include routing, authentication, access control and billing subscribers. Examples of core network nodes include switches, management nodes, serving gateways, support nodes and charging systems. Core network node 130 may connect to further core network nodes, which are not illustrated in FIG. 1, by means of connection 137. Core network node 130 may connect to the internet 140 by means of connection 135. In some embodiments core network node 130 connects to the internet via connection 137 instead of connection 135.

In some embodiments core network node 130 may be absent, in which case base station 120 may be connected directly to other base stations and, optionally, the internet 140. In such cases base station 120 may be furnished with at least some of the core network functions mentioned above. In some embodiments nodes not illustrated in FIG. 1 may be present, for example a base station controller node may be disposed between base station 120 and core network node 130.

In some embodiments, in addition to or instead of the cellular chain comprising base station 120 and core network node 130 mobile 110 may communicate by means of a non-cellular chain comprising access point 150 and gateway 160. Mobile 110 may communicate with access point 150 via link 117 which may operate according to a non-cellular RAT, such as wireless local area network, WLAN, technology or worldwide interoperability for microwave access, WiMAX, technology, for example. Link 117 may, like wireless link 115, comprise an uplink and a downlink. Access point 150 may be connected to gateway 160 by means of connection 155. Connection 155 may be a wire-line connection such as an Ethernet or digital subscriber line, DSL, connection, for example. Gateway 160 may be capable of communicating with internet 140 by means of connection 165 and by further gateways by means of connection 167, which may both be wire-line connections or wireless connections. In some embodiments gateway 160 is absent and access point 150 is directly connected to internet 140 and/or other access points.

In some embodiments an interconnection is provided between the cellular and non-cellular chains. This interconnection is not illustrated in FIG. 1, and can take place between base station 120 and access point 150, or between core network node 130 and gateway 160, for example. The interconnection may be used to co-ordinate multimode communication between mobile 110 and the compound cellular/non-cellular system comprising the cellular chain and the non-cellular chain. In some embodiments base station 120 and access point 150 are co-located, providing for a good opportunity for an interconnection with low latency.

Responsive to a user of mobile 110 requesting information from a network, such as internet 140, mobile 110 may be configured to determine whether it has a connection already, or whether it is in an idle state without a connection. Responsive to a determination that mobile 110 is in idle state without a connection, mobile 110 may be configured to initiate connectivity to internet 140 via the cellular or non-cellular route. The initiating may comprise, for example, establishing a radio bearer to base station 120 or access point 150, resolving an address using a domain name system, DNS, server, and establishing a protocol connection to a node comprised in the network.

In the example of a LTE system, mobile 110 may be in a detached, idle or active state. The detached state may correspond to a state where mobile 110 has recently been switched on and mobile 110 is in the process of searching for a network, authenticating with the network and registering its presence in the network. The active state may correspond to a state where mobile 110 is registered in the network and where it has a radio resource control, RRC, connection with base station 120. When mobile 110 is in the active state, the cellular network may be capable of transmitting information to mobile 110 due to an assignment of air interface resources being present. The idle state may correspond to a low-power state where no RRC connection is active between mobile 110 and base station 120. In some embodiments, base station 120 doesn't store context information relating to mobiles in idle state.

Mobile 110 may be in different states with respect to the cellular and the non-cellular systems. In particular, since non-cellular RATs may consume more battery resources than cellular RATs, mobile 110 may be configured to assume a low-power state with respect to the non-cellular system when no active communication has been effected over the non-cellular chain for a certain time. As a particular example, where the non-cellular system comprises a WLAN system, mobile 110 may be configured to switch off its WLAN transceiver when it isn't in use. Cellular RATs may be designed to support prolonged attachment with no active data communication, while minimizing battery drain. Therefore a multimode mobile 110 may remain connected to the compound cellular/non-cellular system while keeping the non-cellular transceiver switched off and the cellular transceiver in a minimal power mode that allows it to receive paging messages from the cellular system, the paging messages indicating there is an incoming call or data for mobile 110. In this document, we discuss "a transceiver" with which it's meant, where appropriate, a multimode transceiver which may physically comprise two or more distinct transceivers. Examples of distinct transceivers may include, for example, a cellular transceiver and a non-cellular transceiver. Likewise with, for example, "WLAN transceiver" it's meant a WLAN part of a multimode transceiver.

Some cellular RATs are designed to support further enhancements to conserve battery resources, such as discontinuous reception, DRX. When mobile 110 is configured with DRX instructions from the cellular chain, mobile 110 may keep its cellular transceiver switched off except for pre-determined time instants when the cellular transceiver is switched on. In this context a time instant may be a relatively short time period. The cellular system will know the predetermined time instants and page mobile 110 only during these pre-determined time instants. Paging mobile 110 at other times when DRX is configured would be useless, since with the cellular transceiver switched off mobile 110 wouldn't be capable of receiving the paging signals. Where the DRX instructions define a DRX pattern that specifies that the cellular transceiver of mobile 110 is switched off 90% of the time, up to 90% of the idle-mode power consumption of the cellular transceiver may be conserved. When an incoming data unit or call arrives for mobile 110 at a moment when the DRX pattern indicates the cellular transceiver of mobile 110 is switched off, the cellular system may be configured to wait for the next pre-determined time instant, when according to the DRX pattern the cellular transceiver of mobile 110 will be switched on, before paging mobile 110. Thus the DRX pattern may represent a tradeoff between battery conservation and a slightly increased delay in establishing connections toward mobile 110.

In an LTE system DRX may be configured for both idle and connected mode separately. In LTE, mobile 110 is known as a user equipment, UE, and base station 120 is known as an evolved node-B, eNB. In LTE idle mode the DRX pattern controls when the UE listens to paging, as described above. In LTE connected mode the DRX pattern controls when the UE monitors a physical or logical control channel, which may in an LTE system be known by the acronym PDCCH, for example, in order to receive uplink grants or downlink assignments. Either or both idle and connected mode can be used with respective embodiments of the current invention. When the UE is in LTE idle mode, paging in LTE can be utilized to wake up the UEs WLAN. That could in practice mean that eNB sends paging, UE responds with random access and responsive to successful contention resolution, an eNB may be configured to indicate to the UE that it should activate WLAN and receive data via the WLAN. When a UE is in connected mode and monitors PDCCH, then WLAN allocations can be received. WLAN allocations may take the form of special PDCCH assignments, for example. One possibility to distinguish WLAN allocations from LTE allocations could be the use of a separate identifier, such as for example a radio network temporary identifier, RNTI, for WLAN allocations: when a UE monitors a control channel, it would in addition to a normal identifier, such as for example a cell-RNTI, C-RNTI, search also for a WLAN-RNTI. If the UE receives the control channel with WLAN-RNTI, then UE would use that allocation in the WLAN side, in other words responsive to receiving an identifier associated with the non-cellular chain the UE may be configured to activate a non-cellular transceiver and start receiving a non-cellular signal on the allocated frequency. Alternatively, the non-cellular identifier may be a logical channel command, for example a PDCCH command similar to a PDCCH order. WLAN is an example of a non-cellular technology.

Mobile 110 may receive data over the cellular chain independently of the non-cellular chain, and mobile 110 may receive data over the non-cellular chain independently of the cellular chain. Where mobile 110 has configured its non-cellular transceiver to an inactive state and data is incoming over the non-cellular chain, mobile 110 cannot be paged by access point 150 since mobile 110 is not at that moment capable of receiving signals transmitted by access point 150 due to the inactive state of the non-cellular transceiver. In some embodiments of the invention, the non-cellular chain in the network side can inform the cellular chain of the incoming data using the interconnection described above.

Base station 120 may then act on the information by issuing to mobile 110 a page, wherein the page informs mobile 110 that there is incoming data in the non-cellular chain. If mobile 110 is in a DRX mode, base station 120 may be configured to use a configured DRX pattern to select a time instant for paging mobile 110 such that mobile 110 is capable of receiving the page. The page that base station 120 sends may be a modified version of a cellular page, such that the page comprises an indication that the incoming information is incoming in the non-cellular chain.

Responsive to receiving the modified page, or more generally an indication that information is incoming in another RAT than the one used to convey the indication, mobile 110 may be configured to activate the transceiver corresponding to the RAT over which the information is incoming, and receive the information. In some embodiments, the page comprises an indication of a time when the information is to be transmitted from the RAT over which the information is incoming.

In general, there may be provided an apparatus, for example mobile 110 or an integrated control device configured to be installed in mobile 110 to control mobile 110. The apparatus comprises a transceiver configured to support operation of the apparatus in accordance with at least a first RAT and a second RAT. Where the apparatus is mobile 110, the transceiver may be a multimode radio transceiver, and where the apparatus is an integrated control device for controlling mobile 110, the transceiver may be an input/output unit comprised in the integrated control device that is configured to control a multimode radio transceiver of mobile 110. The transceiver comprised in the apparatus is further configured to receive an indication conveyed over the second RAT, that data is incoming to the apparatus. The indication indicates that the data is to be conveyed over the first RAT. Where the transceiver is a radio transceiver comprised in mobile 110, it can receive the indication directly over the second RAT. Where the transceiver is comprised in an integrated control device for inclusion in mobile 110, it can be configured to receive the indication from the radio transceiver, the radio transceiver having received it over the radio interface of the second RAT. The apparatus further comprises at least one processing core configured to react to the received indication by causing the apparatus to receive the data in accordance with the first RAT. Where the apparatus is mobile 110, the at least one processing core can direct the first-RAT radio transceiver to receive the data and provide it in appropriate form to other components comprised in mobile 110. Where the apparatus is an integrated control device for inclusion in mobile 110, at least one processing core comprised in the integrated control device may be configured to cause the first RAT radio transceiver to receive the data and to provide it to other components comprised in mobile 110.

In some embodiments, the at least one processing core is configured to cause the apparatus to enter an inactive state with respect to the first RAT, and responsive to the indication cause the apparatus to enter an active state with respect to the first RAT. Following successful reception of the data, the at least one processing core may be further configured to cause the apparatus to re-enter an inactive state with respect to the first RAT. In this regard, entering a state with respect to the first RAT may comprise that the first-RAT radio transceiver enters the state. Where the apparatus is mobile 110, entering a state thus comprise that the first-RAT transceiver comprised in mobile 110 is caused to enter the state. Where the apparatus is an integrated control device for inclusion in mobile 110, this may comprise that the integrated control device is configured to cause, by signaling, a first-RAT transceiver to enter the state.

In some embodiments, the indication comprises an indication as to a time, when the data is incoming over the first RAT. The time may be indicated as absolute time, where the apparatus and the compound network have access to a reliable source of absolute time. Reliable sources of absolute time include timing from a global positioning satellite constellation, or alternatively the cellular chain, for example, may have access to reliable time and may be configured to update the reliable time at intervals to mobiles 110 attached to the cellular chain. In other embodiments, instead of absolute time a relative time reference is used. A relative time reference may comprise, for example, timing information expressed in terms of a frame or timeslot structure of the first RAT or the second RAT. The apparatus may be configured to convert relative time to absolute time, or absolute time to relative time, to facilitate receiving the data at the correct time.

In some embodiments, the at least one processing core is configured to cause a ready signal to be transmitted to a node, such as for example access point 150 or base station 120, in accordance with the first RAT or the second RAT. Causing a ready signal to be transmitted may comprise causing, by the processing core, a radio transceiver to transmit the ready signal or alternatively causing an input/output unit comprised in an integrated control device to signal to a radio transceiver to cause the radio transceiver to transmit the ready signal. The ready signal may be transmitted responsive to the indication, or responsive to a transition of the apparatus to an active state with respect to the first RAT.

In some embodiments, the at least one processing core is configured to cause the ready signal to be transmitted to a node, such as for example base station 120, in accordance with the second RAT. In some embodiments, the ready signal is sent according to the first RAT only. In other embodiments, the ready signal is sent to the second RAT only. In yet further embodiments, the ready signal is sent to both the first RAT and the second RAT.

In some embodiments, where the apparatus determines that the data isn't successfully received in accordance with the first RAT, the at least one processing core is configured to cause the apparatus to request to receive the data in accordance with the second RAT. The determination that the data isn't successfully received may be based at least in part on a checksum comprised in or relating to the received data. As another example, the determination that the data isn't successfully received may be based at least in part on a timer expiring in the apparatus before the data is received. Responsive to the request, the compound system may be configured to attempt to deliver the data over the second RAT, using the interconnection to convey the data to the second-RAT part of the compound system.

In one embodiment, the first RAT is a wireless local area network technology such as for example WLAN or WiMAX, and the second RAT is a cellular technology such as for example WCDMA or LTE.

In general there are also provided methods to operate apparatuses according to embodiments described herein, and apparatuses and computer programs configured to cause methods described herein to be performed. When an apparatus has data to send toward the network, it may be configured to perform a method comprising determining that the apparatus has data to send. The method further comprises attempting to send the data in accordance with the first RAT, and responsive to a failure to send the data in accordance with the first RAT, request from a base node of the second RAT whether the apparatus is to send the data in accordance with the first RAT or the second RAT.

In some embodiments, responsive to receiving an indication from the base node that the data is to be sent in accordance with the first RAT, the method comprises retrying to send the data in accordance with the first RAT. Sending in accordance with the first RAT may comprise, for example, sending the data using a first-RAT radio transceiver and first-RAT air interface resources. In some embodiments, responsive to receiving an indication from the base node that the data is to be sent in accordance with the second RAT, the method comprises trying to send the data in accordance with the second RAT.

In some embodiments, the indication from the base node comprises a resource grant concerning resources used when communicating in accordance with the first RAT. The resources may comprise air interface resources, for example indication of at least one frequency band, frequency channel, timeslot, spreading code or orthogonal frequency channel combination.

Figure 3:
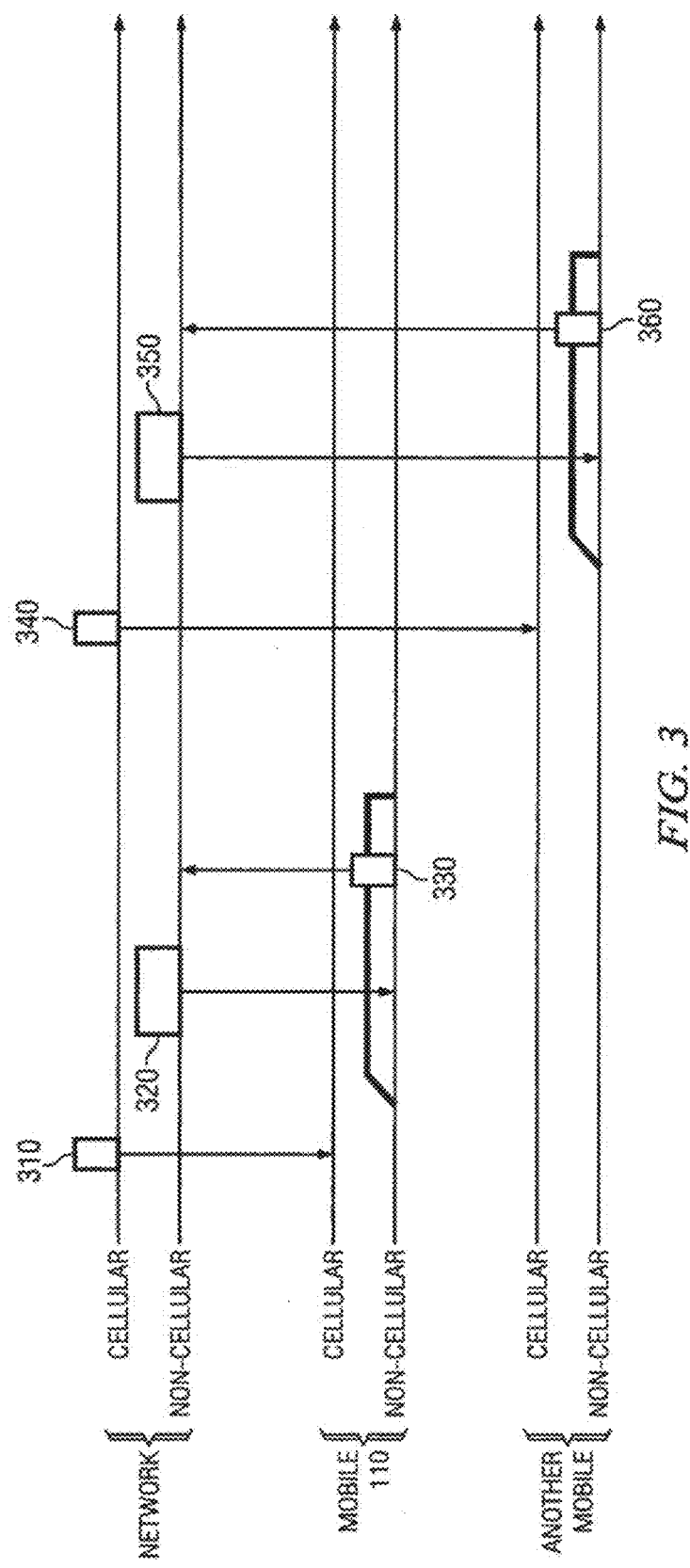
FIG. 3 is a signaling diagram showing operations for an embodiment of the invention.

FIG. 3 is a signaling diagram showing operations for a method according to an embodiment of the invention. In FIG. 3, messages are illustrated as vertically oriented arrows and they are labeled along the top of the figure starting from from 310 at increments of ten. Time progresses from left to right. The topmost two horizontal lines represent the cellular and non-cellular chains on the network side. The two horizontal lines in the middle represent the cellular and non-cellular chains in a transceiver of mobile 110. The lowest two horizontal lines represent a multimode transceiver of another mobile.

In phase 310, the cellular chain of the network transmits, using the cellular air interface, an indication to mobile 110 that data is incoming for mobile 110 over the non-cellular chain. The indication may comprise an indication of time, when the non-cellular chain will transmit the incoming data. The cellular chain may receive knowledge of the incoming data via an interconnection with the non-cellular chain. The indication may comprise a resource allocation, such as frequency sub-band and/or timeslot allocation with respect to the non-cellular air interface. Mobile 110 receives the indication, for example a page or resource allocation message, using its cellular transceiver. Responsive to receiving the indication, mobile 110 starts up its non-cellular transceiver, which is schematically indicated in the figure, in time for receiving the data using the non-cellular transceiver, phase 320. The data, which is communicated over the non-cellular interface, may thus be transmitted using substantially different air interface resources, such as a frequency band, than were used to convey the indication in phase 310. The air interface resources used to receive the data in mobile 110 may correspond to a resource allocation comprised in the indication of phase 310, in embodiments where the indication of phase 310 comprises a resource allocation. In phase 330 mobile 110 may transmit an acknowledgement that the data was successfully received. While the acknowledgement is illustrated as being transmitted to the non-cellular chain, in some embodiments the acknowledgement is transmitted in phase 330 to the cellular chain, and forwarded by the cellular chain to the non-cellular chain using the interconnection. In some embodiments the acknowledgement is transmitted to both the cellular chain and the non-cellular chain. Phase 330 is optional. Phase 330, when present, increases the reliability of communication in the sense that where the data is unsuccessfully received, for example when mobile 110 determines that a checksum comprised in the data doesn't match, mobile 110 may request a re-transmission of the data from the non-cellular chain. Following phase 330, the figure schematically indicates that mobile 110 configures its non-cellular transceiver once more to an inactive, low-power state.

Phases 340, 350 and 360 illustrate a similar procedure as phases 310, 320 and 330 with respect to another mobile, which may as far as the illustrated process is concerned correspond functionally to mobile 110.

FIG. 4 is a signaling diagram showing operations for a method according to an embodiment of the invention. The layout in terms of labeling of messages in FIG. 4 is similar to that of FIG. 3. Like FIG. 3, FIG. 4 illustrates the cellular and non-cellular chains of the compound network with the upper two horizontal lines, and the cellular and non-cellular parts of the multimode transceiver of mobile 110 are illustrated by the lower two horizontal lines.

In phase 410, the compound system transmits to mobile 110 an indication, which may substantially correspond to the indication of phase 310 in FIG. 3. In phase 420, mobile 110 transmits to the cellular chain an indication that the non-cellular transceiver comprised in mobile 110 has been started up, and the incoming data may be transmitted over the non-cellular chain and non-cellular air interface to mobile 110. As in FIG. 3, the transition of the non-cellular transceiver comprised in mobile 110 to an active state is schematically illustrated. Phases 430 and 440 may substantially correspond to phases 320 and 330 of FIG. 3, respectively. In the embodiment illustrated in FIG. 4, the indication of phase 420 is transmitted to the cellular chain. The cellular chain will be responsive to receiving the indication of phase 420 and inform, via the cellular to non-cellular interconnection, the non-cellular chain that mobile 110 is ready. In other embodiments mobile 110 may be configured to transmit a similar indication that the non-cellular transceiver is ready to the non-cellular chain, which may have the advantage that the indication need not be forwarded from the cellular chain to the non-cellular chain over the interconnection. In these other embodiments, the indication to the cellular chain may be omitted. In yet further embodiments, mobile 110 may be configured to transmit an indication to both the cellular and the non-cellular chain, the indication indicating that the non-cellular transceiver comprised in mobile 110 is ready. Following the optional acknowledgement of phase 440, the non-cellular transceiver comprised in mobile 110 may be transitioned once more to a low-power and/or inactive state. Also in the absence of the optional phase 440, mobile 110 may be transitioned once more to a low-power and/or inactive state.

FIG. 5 is a signaling diagram showing operations for a method according to an embodiment of the invention. While FIG. 3 and FIG. 4 are concerned with downlink, that is network-to-mobile, communications, the embodiment of FIG. 5 is concerned with uplink, that is mobile-to-network, communications.

The labeling scheme of FIG. 5 is similar to those of FIG. 3 and FIG. 4. In phase 510, mobile 110 transmits via the cellular transceiver and the cellular air interface a request to the cellular chain, the request requesting permission to transmit data to the compound network via the non-cellular chain. During this time the non-cellular transceiver comprised in mobile 110 may be in an inactive state. The request may comprise information concerning the data to be transmitted from mobile 110. Such information may comprise, for example, the amount of the data, the error tolerance of the data and/or a confidentiality or priority level of the data. In phase 520 the compound network authorizes the requested transmission by transmitting a permission via the cellular air interface to mobile 110. The permission may comprise an air interface resource allocation obtained by the cellular chain by negotiating with the non-cellular chain over the cellular to non-cellular interconnection. In embodiments where the request of phase 510 comprises information concerning the data to be transmitted, the cellular chain or the compound network may decide to direct mobile 110 to transmit the data over the cellular chain instead of the non-cellular chain. If this occurs, such re-direction information may be conveyed in the permission of phase 520. For example, where the compound system knows that the non-cellular chain in the location of mobile 110 doesn't support air interface encryption and the data is indicated in the request of phase 510 as sensitive, the compound system may re-direct the data to be transmitted over the cellular interface instead of the non-cellular interface.

Responsive to receiving the permission of phase 520, mobile 110 in the illustrated embodiment may be configured to cause the non-cellular transceiver comprised in mobile 110 to transition to an active state, which is schematically illustrated in FIG. 5. Responsive to the non-cellular transceiver becoming active, mobile 110 may be configured to transmit the data to the non-cellular chain using the non-cellular air interface and associated non-cellular air interface resources, which may be defined at least in part in the permission of phase 520. In phase 540, the non-cellular chain, for example access point 150, transmits to mobile 110 an acknowledgement that the data was successfully received. Alternatively where there is at least one error detected in the data, access point 150 may request a retransmission of the data in phase 540. Where there is at least one error detected in the data and the data was indicated in phase 510 as being error-tolerant, access point 150 may positively acknowledge receiving the data regardless of the at least one error. While phase 540 is illustrated as an acknowledgement from the non-cellular chain to mobile 110, in some embodiments the acknowledgement is sent via the cellular chain instead of the non-cellular chain. In this case, the non-cellular chain may inform the cellular chain via the interconnection, that an acknowledgement of successful reception or a retransmission request should be transmitted to mobile 110 over the cellular air interface.

Figure 2:
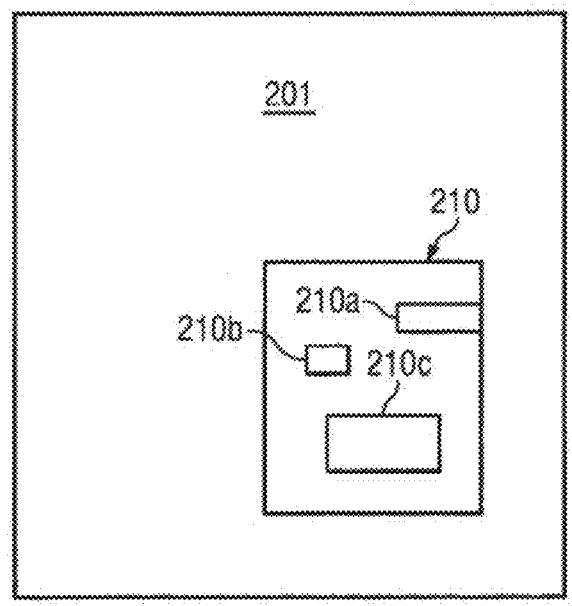
FIG. 2 illustrates an example apparatus 201 capable of supporting at least some embodiments of the present invention.

FIG. 2 illustrates an example apparatus 201 capable of supporting embodiments of the present invention. The apparatus may correspond to mobile 110, or base station 120, for example. The apparatus is a physically tangible object, for example a mobile telephone, personal digital assistant, base station, access point, data dongle or a similar device. The apparatus may comprise a control apparatus 210, for example a microprocessor, digital signal processing, DSP, processor, field-programmable gate array, FPGA, application-specific integrated circuit, ASIC, chipset or controller. The apparatus may further comprise a transmitter and/or a receiver 210*a* configured to enable the apparatus 201 to connect to other apparatuses. A combination of transmitter and receiver may be called a transceiver. The apparatus may comprise memory 210*b* configured to store information, for example air interface resource configuration information. The memory may be solid-state memory, dynamic random access memory, DRAM, magnetic, holographic or other kind of memory. The apparatus may comprise logic circuitry 210*c* configured to access the memory 210*b* and control the transmitter and/or a receiver 210*a*. The logic circuitry 210*c* may be implemented as software, hardware or a combination of software and hardware. The logic circuitry 210*c* may comprise an integrated control device, which may comprise at least one processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna.

The structural elements disclosed above in connection with FIG. 2 are examples of technical means for accomplishing objectives of the invention. For example, logic circuitry 210c is an example of processing means or controlling means configured to cause apparatus 201 to perform actions. Similarly memory 210b is an example of means for storing information, and transmitter and/or receiver 210a is an example of means for communicating.

Without in any way limiting the scope, interpretation, or application of the claims appearing below, a technical effect of one or more of the example embodiments disclosed herein is that a transceiver of a first radio access technology may be kept in a low-power state while a multimode terminal is attached to a compound network by means of a second radio access technology. Another technical effect of one or more of the example embodiments disclosed herein is that a transceiver of a first RAT can be transitioned to an active state only when permission to send has been granted over a second RAT, whereby energy is conserved. Another technical effect of one or more of the example embodiments disclosed herein is that a compound two-RAT network can decide which RAT to use for data, depending on characteristics of the data. Whereas embodiments of the invention were described above that kept the non-cellular transceiver of mobile 110 in an inactive state and remained attached to the compound network via the cellular interface, the scope of the invention comprises also embodiments where the situation is vice versa, in other words the cellular interface is kept in an inactive state and mobile 110 is kept attached to the compound network via a non-cellular interface. Likewise, whereas the first RAT and second RAT were described as a cellular and non-cellular RAT, the scope of the invention comprises also embodiments where both RATs are cellular, and embodiments where both RATs are non-cellular.

Embodiments of the present invention may be implemented in software, hardware, application logic or a combination of software, hardware and application logic. The software, application logic and/or hardware may reside on memory 210b, the control apparatus 210 or electronic components, for example. In an example embodiment, the application logic, software or an instruction set is maintained on any one of various conventional computer-readable media.

In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a transceiver configured to support operation of the apparatus in accordance with a first radio access technology and a second radio access technology;
the transceiver being configured to receive an indication conveyed over the second radio access technology, the indication indicating that data is incoming to the apparatus and that the data is to be conveyed over the first radio access technology, and
at least one processing core configured to, responsive to the indication, cause the apparatus to receive the data by operating in accordance with the first radio access technology,
wherein the indication comprises a relative or absolute indication of a future time instant, when transmission of the data to the apparatus will begin over the first radio access technology.

2. The apparatus according to claim 1, wherein the at least one processing core is configured to cause the apparatus to enter an inactive state with respect to the first radio access technology, and responsive to the indication cause the apparatus to enter an active state with respect to the first radio access technology.

3. The apparatus according to claim 1, wherein the at least one processing core is configured to cause the apparatus to activate a first radio access part of the transceiver in time for receiving the data, in accordance with the indication of time.

4. The apparatus according to claim 1, wherein the at least one processing core is configured to, responsive to the indication, cause the apparatus to transmit a ready signal toward a node in accordance with the first radio access technology.

5. The apparatus according to claim 4, wherein the at least one processing core is configured to cause the apparatus to transmit the ready signal after successfully entering an active state with respect to the first radio access technology.

6. The apparatus according to claim 1, wherein the at least one processing core is configured to, responsive to the indication, cause the apparatus to transmit a ready signal toward a node in accordance with the second radio access technology.

7. The apparatus according to claim 1, wherein responsive to a failure to receive the data successfully in accordance with the first radio access technology the at least one processing core is configured to cause the apparatus to request to receive the data in accordance with the second radio access technology.

8. The apparatus according to claim 1, wherein the apparatus comprises a mobile communication device, the apparatus further comprising an antenna coupled to the transceiver and configured to provide signals to the at least one processing core.

9. The apparatus according to claim 1, wherein the indication of the future time instant comprises at least one of: a length of time, a timeslot number and a frame number.

10. The apparatus according to claim 1, wherein the apparatus is configured to receive information over the first radio access technology independently of the second radio access technology.

11. A method, comprising:
supporting operation of an apparatus in accordance with a first radio access technology and a second radio access technology;
receiving an indication conveyed over the second radio access technology, the indication indicating that first data is incoming to the apparatus and that the first data is to be conveyed over the first radio access technology, and
responsive to the indication, causing the apparatus to receive the first data by operating in accordance with the first radio access technology,
wherein the indication comprises a relative or absolute indication of a future time instant, when transmission of the data to the apparatus will begin over the first radio access technology.

12. The method according to claim 11, further comprising causing the apparatus to enter an inactive state with respect to the first radio access technology, and responsive to the indication causing the apparatus to enter an active state with respect to the first radio access technology.

13. The method according to claim 11, further comprising:
determining that the apparatus has second data to send;
attempting to send the second data in accordance with the first radio access technology, and
responsive to a failure to send the data in accordance with the first radio access technology, requesting from a base node operating in accordance with the second radio access technology whether to send the data in accordance with the first radio access technology or the second radio access technology.

14. The method according to claim 13, wherein responsive to an indication from the base node that the second data is to be sent in accordance with the first radio access technology, re-trying to send the second data in accordance with the first radio access technology.

15. The method according to claim 13, wherein responsive to an indication from the base node that the second data is to be sent in accordance with the second radio access technology, trying to send the second data in accordance with the second radio access technology.

16. The method according to claim 14, wherein the indication from the base node comprises a resource grant concerning resources used when communicating in accordance with the first radio access technology.

17. The method according to claim 11, wherein the indication of the future time instant comprises at least one of: a length of time, a timeslot number and a frame number.

18. The method according to claim 11, further comprising receiving information over the first radio access technology independently of the second radio access technology.

19. A non-transitory computer readable medium having stored thereon a set of computer readable instructions that, when executed by at least one processor, cause an apparatus to at least:
support operation of the apparatus in accordance with a first radio access technology and a second radio access technology;
receive an indication conveyed over the second radio access technology, the indication indicating that first data is incoming to the apparatus and that the first data is to be conveyed over the first radio access technology, and
responsive to the indication, cause the apparatus to receive the first data by operating in accordance with the first radio access technology,
wherein the indication comprises a relative or absolute indication of a future time instant, when transmission of the data to the apparatus will begin over the first radio access technology.

* * * * *